United States Patent [19]

Takanashi et al.

[11] Patent Number: 4,999,712
[45] Date of Patent: Mar. 12, 1991

[54] PHOTOELECTRIC CONVERTING DEVICE FOR FORMING CHARGE LATENT IMAGE AND RECORDING SYSTEM THEREOF

[75] Inventors: Itsuo Takanashi, Kamakura; Shintaro Nakagaki, Fujisawa; Hirohiko Shinonaga; Tsutou Asakura, both of Yokohama; Masato Furuya; Tetsuji Suzuki, both of Yokosuka, all of Japan

[73] Assignee: Victor Company of Japan, Ltd., Yokohama, Japan

[21] Appl. No.: 477,579

[22] Filed: Feb. 9, 1990

[30] Foreign Application Priority Data

Feb. 10, 1989 [JP] Japan ................................. 64-31907

[51] Int. Cl.⁵ ........................ H04N 5/335; H04N 1/23
[52] U.S. Cl. .............................. 358/213.11; 358/110; 358/300; 346/160
[58] Field of Search ...................... 358/213.11, 213.13, 358/300, 296, 310, 332, 236, 233, 225, 241, 209, 100; 346/160, 155, 153.1

[56] References Cited

U.S. PATENT DOCUMENTS

| 4,745,433 | 5/1988 | Fujimura et al. | 346/160 |
| 4,811,089 | 3/1989 | Kiser et al. | 358/75 |
| 4,831,452 | 5/1989 | Takanashi et al. | 358/213.13 |
| 4,914,457 | 4/1990 | Fukatsu et al. | 346/155 |
| 4,945,423 | 7/1990 | Takanashi et al. | 358/300 |

FOREIGN PATENT DOCUMENTS 2011575 10/1970 Fed. Rep. of Germany .

Primary Examiner—John K. Peng
Assistant Examiner—Tuan V. Ho
Attorney, Agent, or Firm—Michael N. Meller

[57] ABSTRACT

There is provided a photoelectric conversion device for an electro-magnetic radiation beam incident thereto, into a charge pattern, the electro-magnetic radiation beam carrying information intended to be recorded. The device has electrodes, a photo-conductive layer member laminated to the electrodes having maximum thickness and a surface defining the maximum thickness between the electrodes, and a gap defined between the surface and a recording member disposed to face the surface of the photo-conductive layer member. There is further provided an apparatus for recording a charge latent image without losing the high resolution. The apparatus has a photoelectric conversion device having an electrode and a photo-conductive layer member on which the charge latent image is generated by projecting an optical image carrying information signals to the photo-conductive layer member, and a recording member having an electrode and a charge holding layer member facing the photo-conductive layer member to form a gap therebetween. A predetermined voltage is applied between the electrodes of the photoelectric conversion device and the recording member to transfer the charge latent image to the charge holding member by spark discharge.

15 Claims, 4 Drawing Sheets

PHOTOELECTRIC CONVERTING DEVICE FOR FORMING CHARGE LATENT IMAGE AND RECORDING SYSTEM THEREOF

BACKGROUND OF THE INVENTION

This invention relates to a photoelectric converting device for forming a charge latent image with high resolution and a recording system thereof. In compliance with an increased demand for a reproduced image with high picture quality and high resolution in recent years, as well known, various systems such as so-called EDTV (Extended Definition TV) system, or HDTV (High Definition TV) system have been proposed for a television system. In order to obtain a reproduced image with high picture quality and high resolution, it is required to provide an image pickup device capable of producing a video signal from which a high picture quality and high resolution image can be recreated. However, for conventional image pickup devices using an image pickup tube, it is difficult to generate such a video signal. The reasons for this are as follows: Since there is a limit to the reduction of the diameter of an electron beam in the pickup tube, high resolution image reproduction by reduction of the diameter of the electron beam cannot be expected. Alternatively, if the target area of the pickup tube is increased, the level of the output signal will be reduced because of the increased output capacity which is proportional to the area of the target. Therefore, high resolution image reproduction by the increase of the target area cannot be realistic. Furthermore, in the case of an image pickup device for a moving picture, since the frequency range of such a video signal reaches several tens to several hundreds MHz for implementation of the high resolution image, the signal to noise ratio deteriorates.

As stated above, conventional image pickup devices could not satisfactorily generate such a video signal to provide a reproduced image of high picture quality and high resolution because of the inevitable use of an image sensor for the construction thereof. In order to solve this, the assignee of this application has already proposed a recording apparatus in which a charge latent image carrying information signals intended to be recorded, is formed in a photo-conductive layer member by projecting an optical image thereto corresponding to the information signals, the charge latent image is then transferred to a charge holding layer member of a recording medium. The recording medium is constructed by laminating, for example, the electrode and an insulating layer member acting as the charge holding layer member and the insulating layer member is composed of a material with extremely high insulation resistance, such as silicon resin, which is capable of holding the charge attached thereon for a long time.

The assignee of this application has also proposed a recording apparatus similar in principle to the previously explained apparatus, in which a charge latent image carrying information signals to be recorded is transferred to a charge holding layer of a recording medium by varying the electric field generated between a photo-conductive layer member and an electrode of the recording medium in accordance with the information signals.

In either of the proposed recording apparatuses, the surface of the photo-conductive layer member on which the charge latent image is firstly formed, and the surface of the charge holding layer member of the recording medium to which the charge latent image is secondary formed, face each other across a small gap and a specific voltage is applied between two electrodes one laminated to the photo-conductive layer another laminated to the charge holding layer. The former electrode is transparent, and the optical image is projected to the photo-conductive layer member through the transparent electrode, and the charge latent image formed on the photo-conductive layer member in response to the projection of the optical image, is transferred onto the surface of the charge holding layer member by a spark discharge caused in the small gap.

The charge latent image formed firstly on the surface of the photo-conductive layer member has a high resolution. However, it is very difficult to transfer the charge latent image without losing the high resolution to the charge holding layer member through the gap, due to undesirable divergence of electric flux lines generated from charges of the charge latent image, which extend to the charge holding layer member.

SUMMARY OF THE INVENTION

An object of this invention is to overcome the above disadvantages by providing a photoelectric conversion device for an electro-magnetic radiation beam incident thereto, into a charge pattern, the electro-magnetic radiation beam carrying information intended to be recorded. The device has electrodes, a photo-conductive layer member laminated to the electrodes having maximum thickness and a surface defining the maximum thickness between the electrodes, and a gap defined between the surface and a recording member disposed to face the surface of the photo-conductive layer member. There is further provided an apparatus for recording a charge latent image. The apparatus has a photoelectric conversion device having an electrode and a photo-conductive layer member on which the charge latent image is generated by projecting an optical image carrying information signals to the photo-conductive layer member, and a recording member having an electrode and a charge holding layer member facing the photo-conductive layer member to form a gap therebetween. A predetermined voltage is applied between the electrodes of the photoelectric conversion device and the recording member to transfer the charge latent image to the charge holding member by spark discharge.

DETAILED DESCRIPTION OF THE PREFERRED EMBODIMENTS

Figure 1:
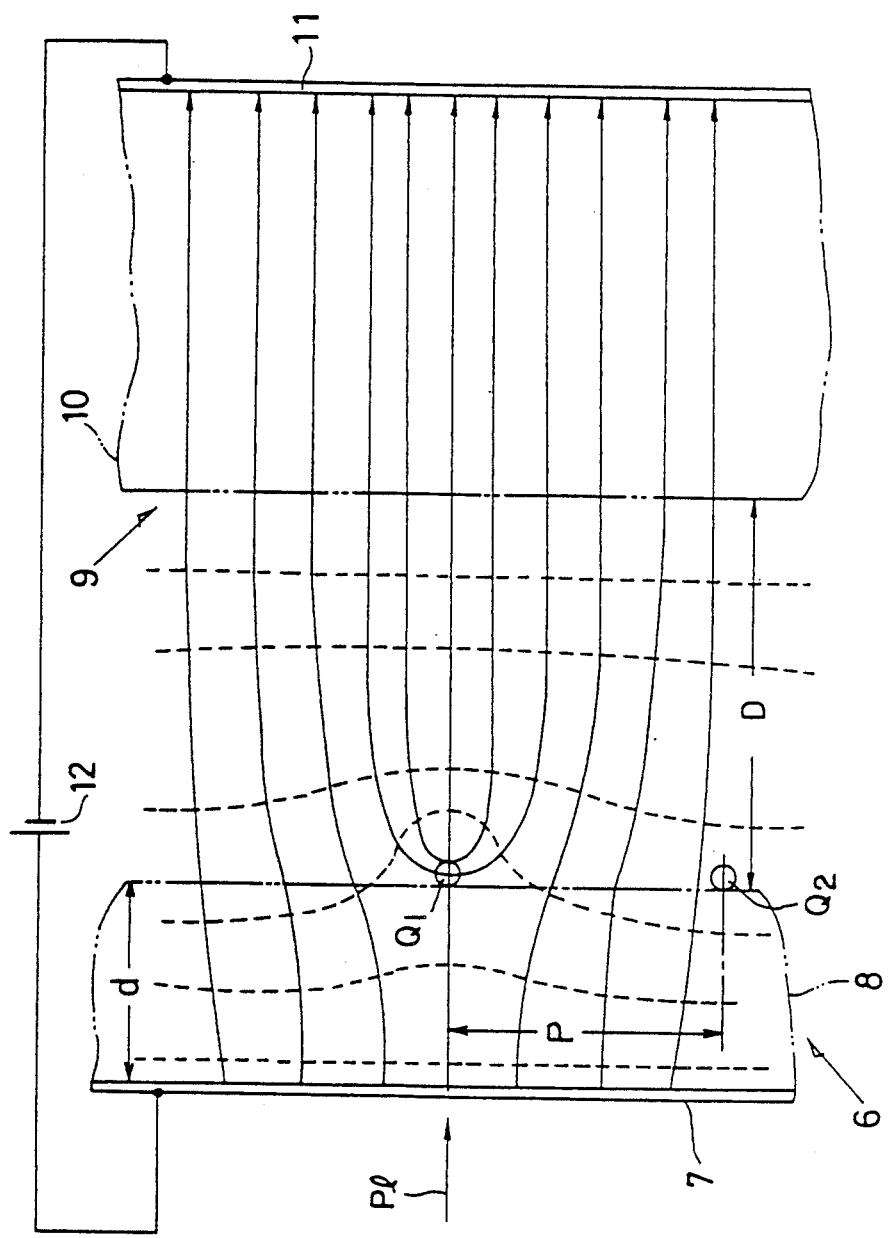
FIGS. 1 through 5 are explanatory views of a photoelectric converting device for forming a charge latent image and a recording system thereof, according to the present invention.

There will be described preferred embodiments of a photoelectric conversion device for forming a charge latent image and a recording system thereof, referring to the accompanying drawings, in detail.

Throughout the drawings, reference numeral 6 denotes a photoelectric conversion device (hereinafter abbreviated in a PEC) for forming the charge latent image used in the charge latent image recording system, according to the present invention, 9 a recording member and 12 an external power source. Other like numerals are also used to designate like elements for the sake of simplicity of explanation.

The recording member 9 is, in the drawings, constructed by laminating an electrode 11 and a charge holding layer member (hereinafter abbreviated in a CHL) 10, which is composed of the material, such as silicon resin, with extremely high insulation resistance, and capable of holding a charge for a long time.

Figure 3A:
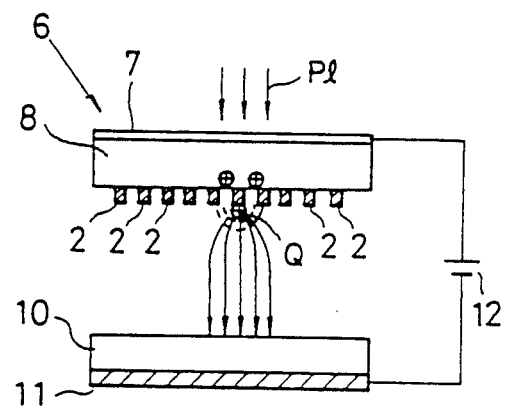
Figure 4:
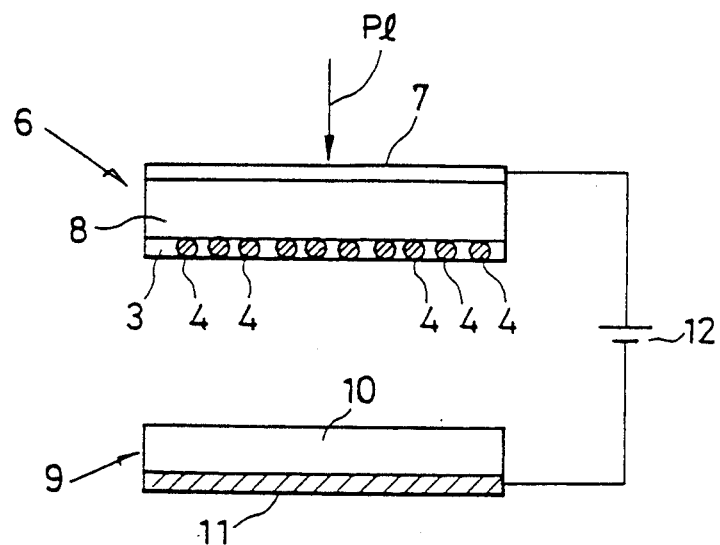
Figure 5:
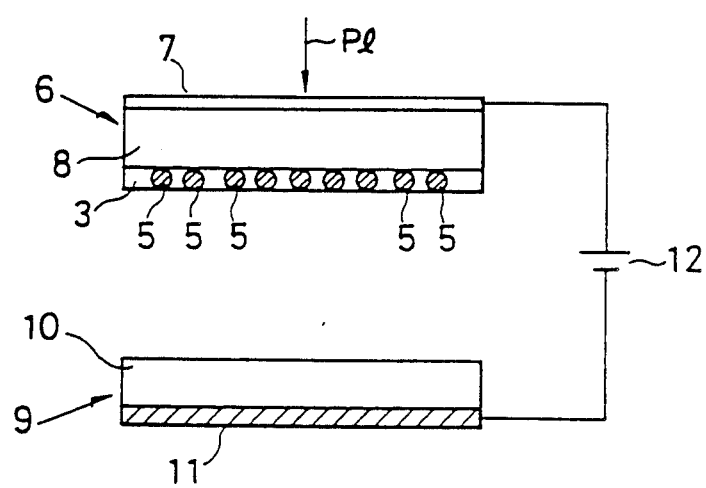

The PEC 6, shown in FIG. 1 is constructed by laminating a transparent electrode 7 and a photo-conductive layer member (hereinafter abbreviated in a PCL) 8 with flat surface. That in FIG. 2(a) is constructed by laminating the transparent electrode 7 and the PCL 8, whose one surface is provided with many small protrusions 1. That in FIG. 3(a) is constructed by laminating the transparent electrode 7 and the PCL 8, whose one surface is provided with many small conductive protrusions 2. That in FIG. 4 is constructed by laminating the transparent electrode 7 and the PCL 8, which is provided with an insulating layer 3, on one surface of which, photo-conductive particles 4 are dispersed. Furthermore, that in FIG. 5 is constructed by laminating the transparent electrode 7 and the PCL 8, which is provided with the insulating layer 3, on one surface of which, conductive particles 5 are dispersed.

The present invention relates to a recording system of a charge latent image by means of a photoelectric conversion device with special construction for forming the echarge latent image wherein the surface of a photo-conductive layer member of the conversion device with a lamination construction of, at least, a transparent electrode and the photo-conductive layer member, and the surface of a charge holding layer member of a recording medium with lamination construction of, at least, an electrode and the charge holding layer member, face each other via a small gap and a predetermined voltage is applied between the transparent electrode and the electrode to transfer the charge latent image generated on the surface of the photo-conductive layer member correspondingly with an optical image projected thereto, onto the surface of the charge holding layer member, preventing the degradation of the resolution of the electric field distribution along the surface of the photo-conductive layer member caused by the charge latent image formed on the surface of the photo-conductive layer.

In FIG. 1, the PEC 6 constructed by laminating the PCL 8 and the transparent electrode 7, and the recording medium 9 constructed by laminating the CHL 10 and the electrode 11 are arranged so that the surfaces of the PCL 8 and the CHL 10 face each other across a gap of distance D, the external power source 12 is connected to the transparent electrode 7 and the electrode 11, and a light P1 forming the optical image is incident to the transparent electrode 7. The light P1 passes the transparent electrode 7 to reach the PCL 8 and is absorbed therein so as to generate pairs of an electron and a hole.

The electric field is generated between the transparent electrode 7 and the electrode 11 by the external power source 12. The electron of the pair is, thus, transferred to the transparent electrode 7 and the hole to the surface of the PCL 8 so as to generate a positive charge Q1 in response to the light P1.

It is required to generate spark discharge in the gap with the distance D in order to transfer the charge latent image generated on the surface of the PCL 8 in accordance with the optical image, to the surface of the CHL 10. The voltage in the gap where the spark discharge is occuring, takes a constant value determined by well known Pachen's law to the product of the distance D and the pressure of gas in the gap. (A discharge-starting voltage in the range of the distance D of 8 to 100 microns, is known to be determined by $312 + 6.2D$ volts.)

The electric field, expressed as the sum of vectors of the electric field by the external power source 12 and that of the positive charge Q1 corresponding to the light P1, is formed in the gap of the distance D. When the gradient of the electric field in the gap reaches the discharge-starting voltage, the charge latent image generated on the surface of the PCL 8 correspondingly with the optical image is transferred onto the surface of the CHL 10 by spark discharge through the gap.

It is important that the electric flux lines of the positive charge Q1 of the charge latent image reach the recording member 9 without diverging each other, in order to transfer the charge latent image to the CHL 10 maintaining the high resolution by the spark discharge across the gap exhibiting a constant gradient of electric field which is determined in accordance with the discharge-starting voltage.

Figure 6:
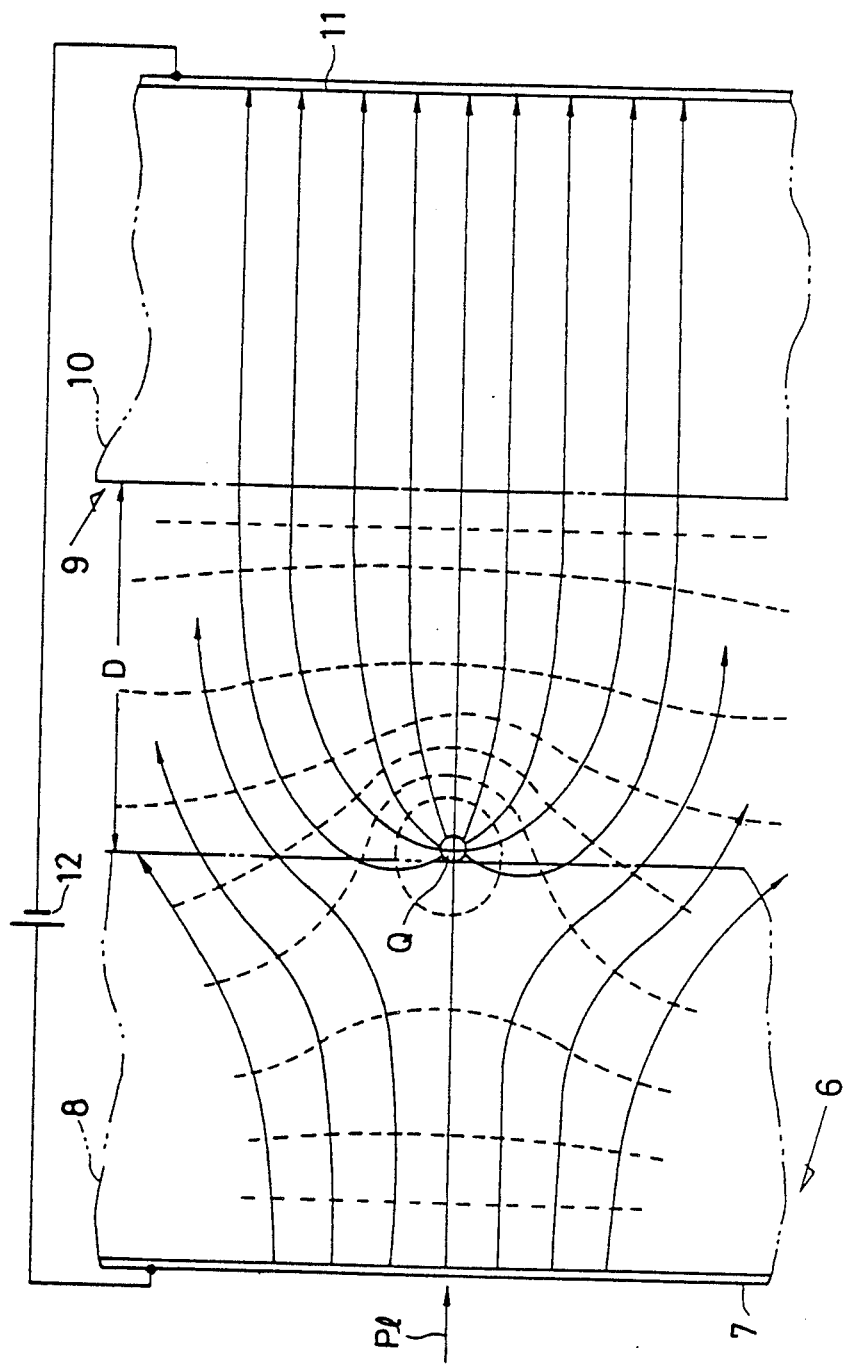
FIG. 6 is an explanatory view of distribution of the electric field of a recording system of a charge latent image, which is different from that of the present invention.

FIG. 6 shows, in the conventional system, the state of electric flux lines (electric field) of the positive charge Q generated on the surface of the PCL 8 intended to transfer the charge latent image of high resolution, generated on the surface of the PCL 8, to the CHL 10 by spark discharge.

As this diagram shows, the electric flux lines of the charge Q generated on the surface of the PCL 8 undesirably diverge in the gap of the distance D, in the conventional system. The charge latent image of originally high resolution generated on the surface of the PCL 8 is considerably degraded after the transfer to the CHL 10.

The recording system of the charge latent image of the present invention is to transfer the charge latent image generated on the surface of a PCL member of a PEC member, correspondingly with the optical image projected thereto, onto the surface of a CHL member of a recording medium by spark discharge and preventing degradation of resolution of the electric field distribution along the surface of the PCL member caused by the charge latent image formed thereon.

FIG. 1 shows an example for the case that the unintended divergence of the electric field distribution along the surface of the PCL 8 of the PEC 6 is limited or prevented by arranging a maximum thickness of the PCL 8 to be smaller than the distance D of the gap between the surfaces of the PCL 8 and the CHL 10.

The example shown in FIG. 1 and the prior art shown in FIG. 6 depict the same distance D and different thicknesses of the PCL 8 for each other.

The solid lines in FIGS. 1 and 6 indicate the vector resultants of the electric fields produced by the external source 12 and the positive charge Q. The curves depicted by broken lines in FIGS. 1 and 6 show equipotential planes of the electric field.

It is thus understood from FIGS. 1 and 6 that the recording system of the charge latent image of the present invention is capable of transferring without degradation the charge latent image with high resolution to the CHL 10, since, compared to the conventional system, the degradation of the resolution of the electric field distribution along the surface of the PCL 8 is prevented where the divergence of the electric flux lines from the positive charge Q1 on the surface of the PCL 8 is limited.

In the present invention, a thickness "d" of the PCL 8 is arranged to be smaller than the shortest distance P between adjacent charges Q1 and Q2 on the PCL surface, the shortest distance P corresponding to the maximum resolution of the charge latent image to be transferred to the surface of the CHL member. In the typical case of the present invention, the thickness "d" is 2 to 5 microns and the shortest distance P is 3 to 10 microns where "d" is always smaller than P.

By doing this arrangement, divergence of the electric flux lines from charges such as Q1 and Q2 is minimized since the transparent electrode 7 is located close to the positions of the charges Q1 and Q2 compared to their shortest distance P.

The recording system of the charge latent image of the present invention, shown in FIGS. 2 to 5, are the examples of the embodiment wherein the surface of a PCL member of a PEC member constructed by laminating, at least, a transparent electrode and the PCL member, and the surface of a CHL member of a recording medium constructed by laminating, at least, an electrode and the CHL member, face each other via a small gap and a predetermined voltage is applied between the transparent electrode and the electrode to transfer the charge latent image generated on the surface of the PCL member correspondingly with an optical image projected thereto, which is applied to the PCL member via the transparent electrode, onto the surface of the CHL member by spark discharge with arrangement of the surface of the PCL member such that electric fields converge so as to prevent the degradation of the resolution of the electrical field distribution along the surface of the PCL member.

Figure 2:
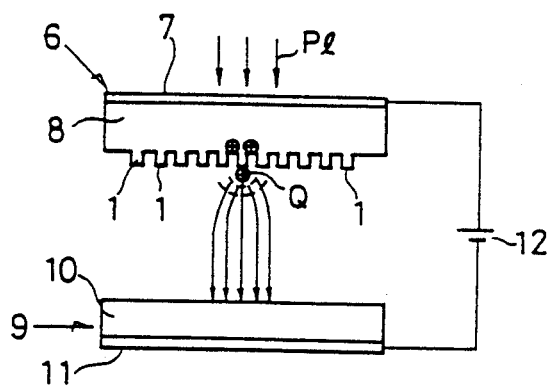

FIG. 2 shows the recording system of the charge latent image wherein the charge latent image, generated on the surface of the PCL 8 of the PEC 6 correspondingly with the optical image projected thereto, is transferred onto the surface of the CHL 10 of the recording medium 9 preventing the degradation of the resolution of the electric field distribution along the surface of the PCL 8 whose surface has a jagged formation.

Figure 2B:
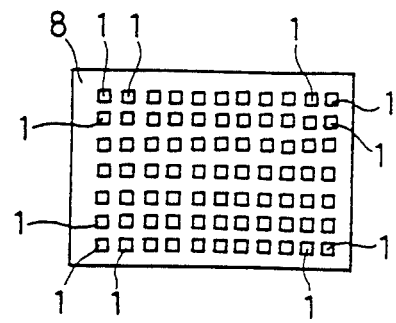

FIG. 2(b) is a plan view showing an example of the distribution state of the protrusions 1 on the surface of the PCL 8. The protrusions 1 are vertically and horizontally aligned with as shown in the figure, however, they may be randomly distributed.

Figure 2C:
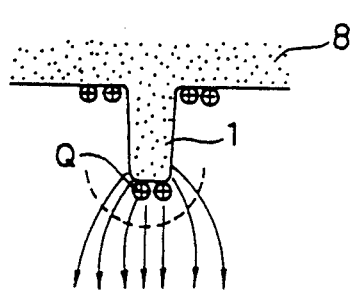

FIG. 2(c) is an enlarged side view of the protrusions 1. The arrow mark depicts electric flux lines generated from the positive charge Q and the curve of the broken line equipotential plane, in the figure.

The PCL 8 and the recording member 9 are arranged so that the surfaces of the PCL 8 and CHL 10 face each other across the specific gap, in FIG. 2(a). The external power source 12 is connected to the electrode 11 and the transparent electrode 7, toward which the light P1 for forming the optical image as information signals to be recorded, is incident.

The light P1 passes the transparent electrode 7 and reaches the PCL 8 where the light P1 is absorbed to generate pairs of an electron and a hole. Due to the electric field applied from the external power source 12 the electron moves to the transparent electrode 7 and the hole to the surface of the PCL 8, to generate the positive charge Q in accordance with the intensity distribution of the light P1 on the surface of the PCL 8.

The PCL 8 is provided with many protrusions 1 on its surface. Electric flux lines converge on the protrusions 1, as is well known, to generate an intense electric field thereon. The states of the electric flux lines generated from the charge Q of the protrusions 1 and the equipotential plane are as depicted by the curves drawn by the solid and broken lines in FIG. 2(c).

Accordingly, as shown in FIG. 2, the degradation of resolution in the transfer process is minimized.

The recording system of the charge latent image, as shown in FIG. 3, is to transfer the charge latent image generated on the surface of the PCL 8, in accordance with the optical image as information signals to be recorded, onto the surface of the CHL 10 by spark discharge with the arrangement that the PCL 8 is provided with many small conductive protrusions 2 on its surface to have a jagged formation which is equivalent to the jagged formation in the embodiment referred to FIG. 2.

It should be noted that the jagged formation in the embodiments referred to FIGS. 2 and 3 may have a saw tooth-wave (not shown) or a square-wave side view as shown in FIG. 2(a) or FIG. 3(a).

Figure 3B:
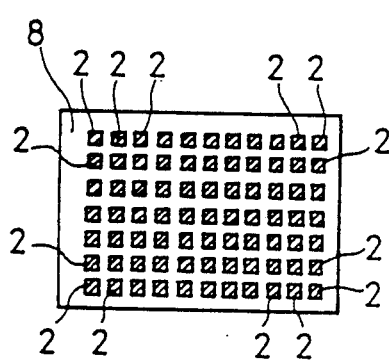
Figure 3C:
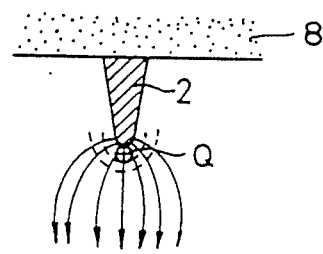

The construction and the operation of the recording system of the charge latent image shown in FIGS. 3(a) to (c) are same as those of FIGS. 2(a) to (c).

FIGS. 4 and 5 show the recording system of the charge latent image, respectively, wherein the insulating layer 3 of the PEC 6 faces the CHL 10 across the predetermined gap to perform the recording operation of the charge latent image. Dispersed small particles 4 and 5 of photo-conductive material covers the outer surface of the insulating layer 3, which serve as the jagged formation. The electric flux lines converge on the dispersed photo-conductive small particles 4 and the photo-conductive small particles 5 shown in FIGS. 4 and 5, serving like the protrusions 1 and the conductive protrusions 2 shown in FIGS. 1 and 3, respectively, so as to transfer the charge latent image with high resolution, generated on the surface of the PCL 8 correspondingly with the optical image projected thereto, onto the surface of the CHL 10, with maintaining the high resolution, by spark discharge through the gap.

Throughout FIGS. 2 to 5, the recording system may be arranged as follows: A crosshatched or striped electrode is provided on the surface of the PCL member or in the gap adjacent to the surface. Or the transparent electrode on which many photo-conductive particles are dispersed is employed in place of the photo-conductive layer 8, from which particles the electric field of the charge latent image is generated for transferring thereof onto the surface of the CHL member by spark discharge.

In the present invention, the light P1 may not necessarily be a visible light which causes the optical image focussed on the photo-conductive layer 8, but it may be an electro-magnetic radiation beam of other forms and carrying information intended to be recorded, which electro-magnetic radiation beam forms a specific pattern on the photo-conductive layer 8.

What is claimed is:

1. A photoelectric conversion device for converting an electro-magnetic radiation beam incident thereto, into a charge pattern, said electro-magnetic radiation beam carrying information intended to be recorded, said device comprising:

(a) electrode means, (b) a photo-conductive layer member laminated to said electrode means, having maximum thickness and a surface defining the maximum thickness between the electrode means, (c) a gap defined between the surface and a recording member disposed to face the surface of the photo-conductive layer member, wherein said maximum thickness of the photo-conductive layer is smaller than a distance of said gap.

2. A photoelectric conversion device for converting an electro-magnetic radiation beam incident thereto, into a charge pattern, said electro-magnetic radiation beam carrying information intended to be recorded, said device comprising:

(a) electrode means, (b) a photo-conductive layer member laminated to said electrode means, having maximum thickness and a surface defining the maximum thickness between the electrode means, (c) a gap defined between the surface and a recording member disposed to face the surface of the photo-conductive layer member, (d) preventing means provided on said photo-conductive layer member for preventing divergence of electric flux lines generated from charges of the charge pattern.

3. A photoelectric conversion device as claimed in claim 2, wherein said preventing means is a jagged formation formed of the surface of said photo-conductive layer member.

4. A photoelectric conversion device claimed in claim 3, wherein said jagged formation is a plurality of protrusions formed on the surface of the photo-conductive layer member.

5. A photoelectric conversion device claimed in claim 2, wherein said preventing means is a cross-hatched electrode provided on the surface of the photo-conductive layer.

6. A photoelectric conversion device claimed in claim 2, wherein said preventing means is a stripped electrode provided on the surface of the photo-conductive layer.

7. A photoelectric conversion device claimed in claim 2, wherein said preventing means comprises an insulating layer on which photo-conductive material particles are dispersed.

8. A photoelectric conversion device for converting an electro-magnetic radiation beam incident thereto, into a charge pattern, said electro-magnetic radiation beam carrying information intended to be recorded, said device comprising:

(a) electrode means, (b) a photo-conductive layer member laminated to said electrode means, having maximum thickness and a surface defining the maximum thickness between the electrode means, (c) a gap defined between the surface and a recording member disposed to face the surface of the photo-conductive layer member, wherein said maximum thickness of the photo-conductive layer member is smaller than a shortest distance between adjacent charges generated on the photo-conductive layer member in response to said electro-magnetic radiation beam incident thereto, said shortest distance corresponding to a maximum resolution of said charge pattern intended to transfer out of the photoelectric conversion device.

9. An apparatus for recording a charge latent image, comprising:

a photoelectric converting means having an electrode and a photo-conductive layer member on which said charge latent image is generated by projecting an optical image to said photo-conductive layer member, said optical image carrying information signals to transfer; and a recording member having an electrode and a charge holding layer member facing said photo-conductive layer member to form a gap therebetween, a predetermined voltage being applied between said electrodes of said photoelectric converting means and said recording member, and said charge latent image being transferred to said charge holding layer member by spark discharge, wherein a thickness of said photo-conductive layer member is smaller than a distance of said gap.

10. An apparatus for recording a charge latent image, comprising:

a photoelectric converting means having an electrode and a photo-conductive layer member on which said charge latent image is generated by projecting an optical image carrying information signals intended to record; and a recording member having an electrode and a charge holding layer member facing said photo-conductive layer member to form a gap thereto, a predetermined voltage being applied between said electrodes of said photoelectric converting means and said recording member, and said charge latent image being transferred to said charge holding layer member by spark discharge, wherein the thickness of said photo-conductive layer member is smaller than a shortest distance between adjacent charges on the photo-conductive layer member, said shortest distance corresponding to a maximum resolution of said charge latent image to be transferred to.

11. An apparatus for recording a charge latent image, comprising:

a photoelectric converting means having, at least, an electrode and a photo-conductive layer member on which said charge latent image is generated by projecting an optical image to said photo-conductive layer member, said optical image carrying information signals to transfer; and a recording member having, at least, an electrode and a charge holding layer member facing said photo-conductive layer member to form a gap therebetween, a predetermined voltage being applied between said electrodes of said photoelectric converting means and said recording member, and said charge latent image being transferred to said charge holding layer member by spark discharge, preventing means provided on said photo-conductive layer member for preventing divergence of electric flux lines generated from charges of the charge latent image.

12. An apparatus for recording a charge latent image as claimed in claim 11, wherein said preventing means comprises a jagged formation formed of a surface of said photo-conductive layer member.

13. An apparatus for recording a charge latent image claimed in claim 12, wherein said jagged formation is a plurality of conductive protrusions.

14. An apparatus for recording a charge latent image as claimed in claim 11, wherein said preventing means comprises a crosshatched electrode provided on a surface of said photo-conductive layer member.

15. An apparatus for recording a charge latent image as claimed in claim 11, wherein said preventing means comprises a stripped electrode provided on a surface of said photo-conductive layer member.

* * * * *